Dec. 10, 1935.  J. PURNASIRI  2,023,821
WATER MOTOR
Filed July 17, 1935  4 Sheets-Sheet 1

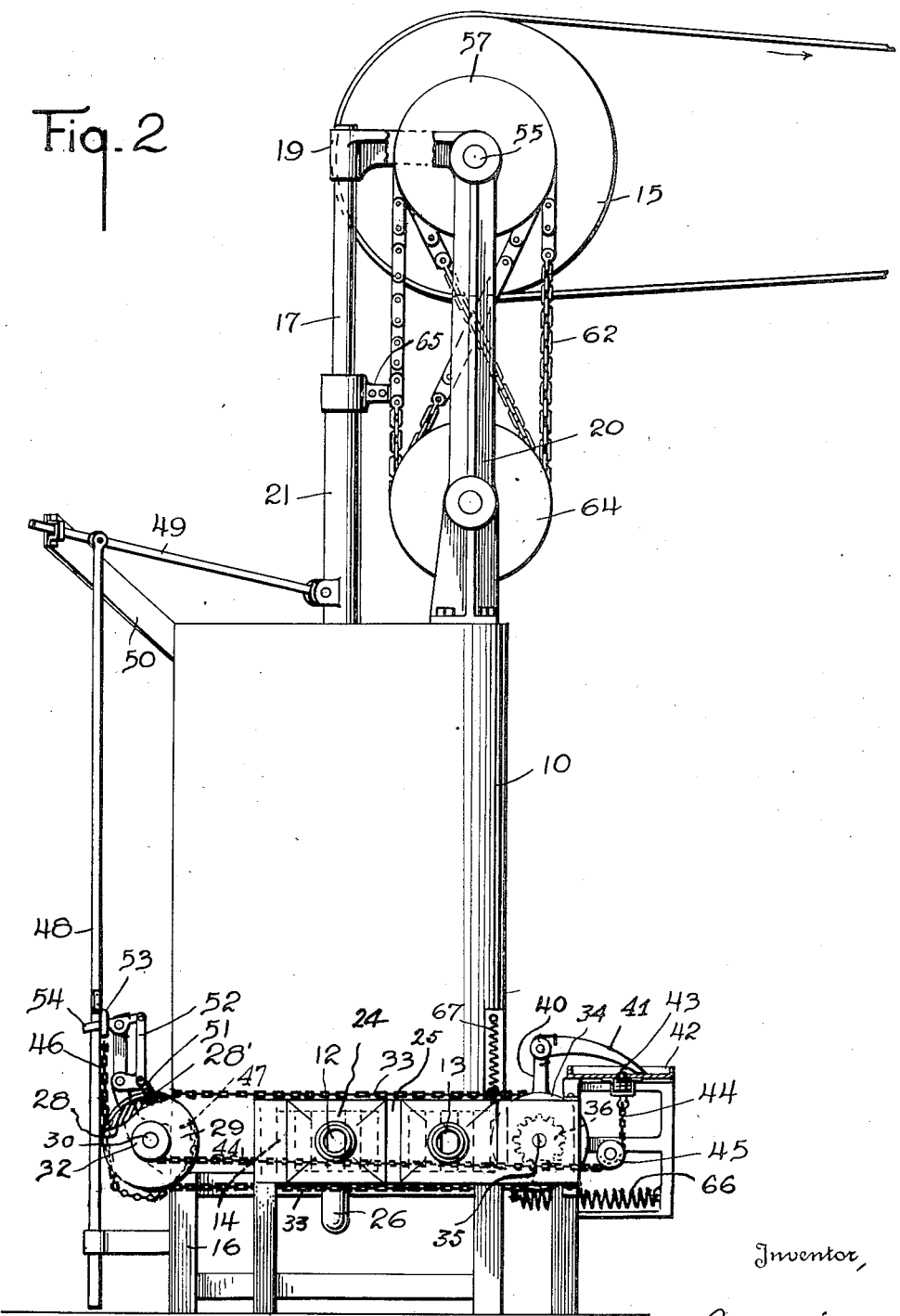

Dec. 10, 1935.  J. PURNASIRI  2,023,821
WATER MOTOR
Filed July 17, 1935  4 Sheets-Sheet 3
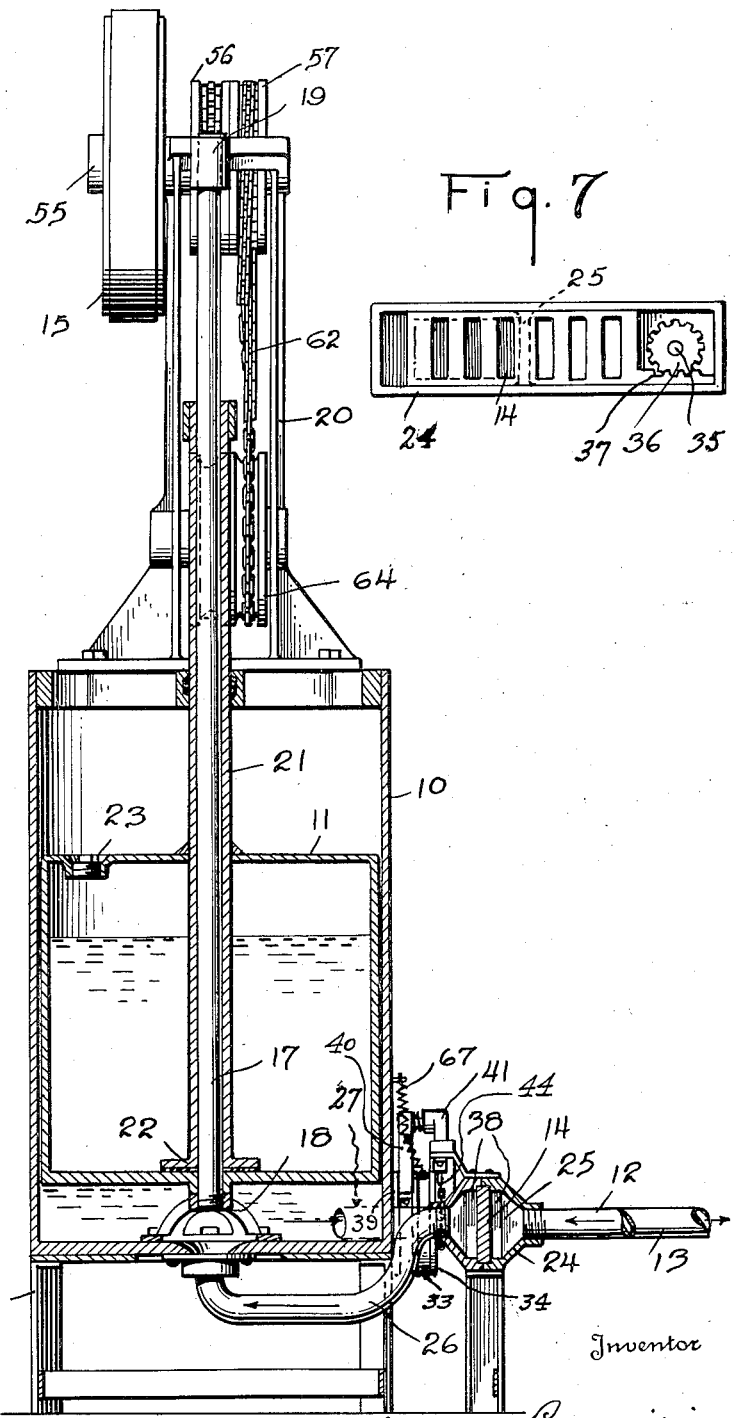
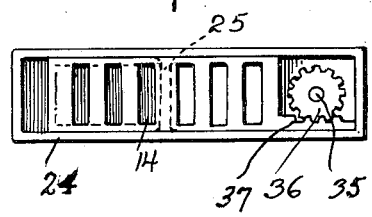

Dec. 10, 1935.  J. PURNASIRI  2,023,821
WATER MOTOR
Filed July 17, 1935   4 Sheets-Sheet 4
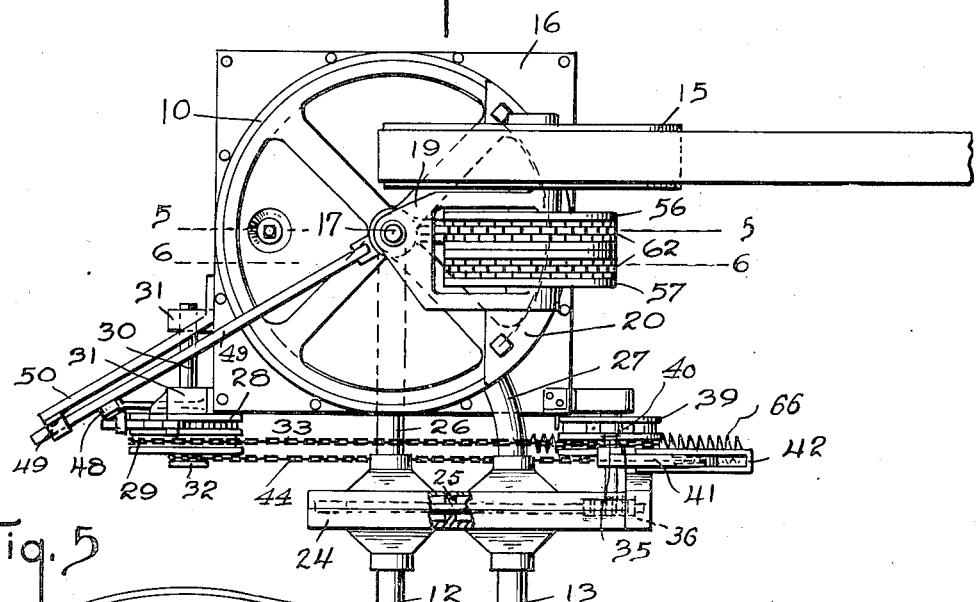
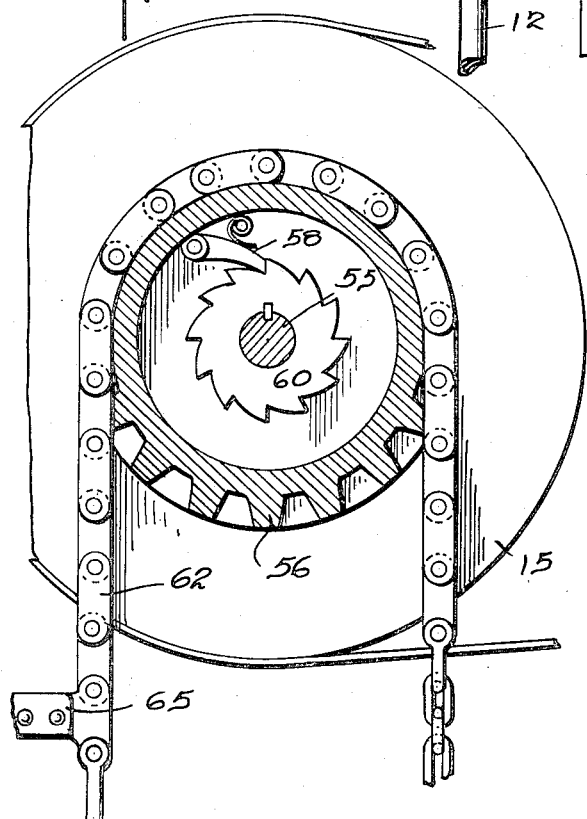
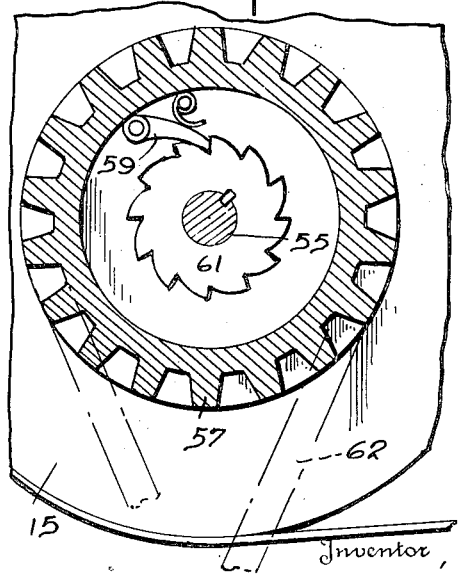

Patented Dec. 10, 1935

2,023,821

UNITED STATES PATENT OFFICE 2,023,821

WATER MOTOR

Jajaval Purnasiri, Bangkok, Siam

Application July 17, 1935, Serial No. 31,951

3 Claims. (Cl. 253—18)

This invention has relation to that class of water powers in which a float is movable up and down by the rise and fall of a body of water in a tank, and this up-and-down movement of the float is translated into continuous rotary motion, in one direction of a power-shaft, the apparatus being adapted to be used for a natural tide or an artificial tide or with any other water-head that would be sufficient to raise the float to the desired height before releasing it for its downward power stroke; and an object of this invention is to not only improve the translating devices, but also the valve mechanism for admitting the water-head to the tank and automatically releasing it therefrom, as more fully hereinafter set forth.

In the drawings annexed:

Fig. 2 is a side elevation thereof;

Fig. 3 is a vertical sectional view of the apparatus;

Fig. 4 is a plan view of the apparatus.

Fig. 5 is a vertical sectional view on the line 5—5 of Fig. 4;

Fig. 6 is a vertical sectional view on the line 6—6 of Fig. 4; and

Fig. 7 is a detail view showing the interior of the reversing valve.

Figure 1:
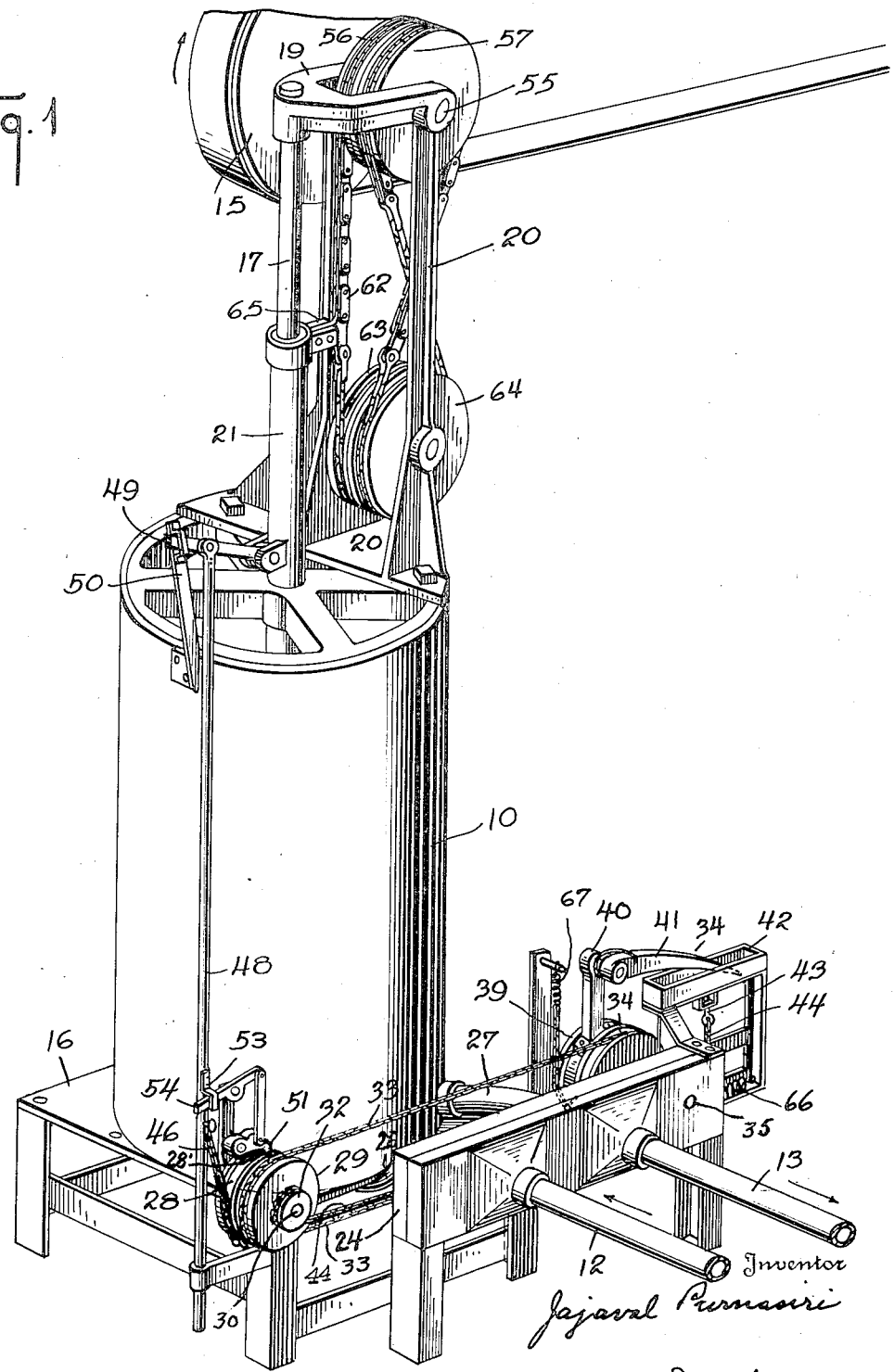
Fig. 1 is a perspective view of an apparatus embodying my invention.

This apparatus comprises a tank 10 forming a float chamber, a float 11 in said chamber, inlet and outlet pipes 12 and 13 respectively for supplying and discharging water from the tank chamber, a valve 14 for controlling the flow of water to and from the tank, a valve controlling mechanism for controlling movements of the valve 14, a power-wheel 15, and a gear and chain driving mechanism for operating said power-wheel.

Tank 10 is preferably cylindrical and can be constructed of metal as shown, or of wood or concrete as desired, and is suitably mounted upon a platform or stand 16. Said tank has a centrally fixed guide-rod 17 which is connected to the bottom thereof by a bracket 18 and extends upwardly a considerable distance above the same and is rigidly secured at its upper end to a suitable bracket 19 which forms a part of a support 20 mounted to the upper edge of the tank 10.

Float 11 which is mounted within the tank, is adapted to rise and fall according to the amount of water furnished to the tank and is guided in its movements by a sleeve 21 which is rigidly fixed to the bottom of the float (as at 22), and extends upwardly throughout the height of the float and above the same a considerable distance, said sleeve being guided by the rod 17, and the float is provided with a filling opening 23 for supplying liquid to the interior thereof to counteract its weight with the water in the tank.

Valve 14 is mounted in a valve-box 24 and to its front-side is connected the inlet and outlet pipes 12, 13. A partition 25 divides the valve-box into two chambers, an inlet chamber connected to inlet pipe 12, and an outlet chamber connected to the outlet pipe 13. At the rear-side of the valve-box is connected a tank supply-pipe 26 which enters through the bottom of the tank, and a tank discharge-pipe 27 which enters the tank through a vertical wall above the bottom thereof.

Mounted at one side of the tank, preferably between the same and the valve-box, is the valve operating mechanism which alternately opens and closes the valve 14 controlling the flow through the inlet and discharge pipes 12 and 13. This valve operating mechanism comprises a lock wheel 28 having a notch 28' in its edge and a belt pulley 29 mounted together on a shaft 30 which is mounted in suitable bearing 31 secured to the tank support, said belt pulley having on its front-side a smaller chain pulley 32 for a purpose hereinafter described. An endless chain or other belt 33 connects pulley 29 with a second belt pulley 34 at the other side of the tank, and this second pulley is mounted on a shaft 35 which extends into the valve-box 24 at one end thereof and has mounted at its outer end a pinion 36 meshing with a relatively short rack-bar 37, see Fig. 7, formed at one end of valve 14.

Valve 14 is adapted to reciprocate between two slotted partitions 38 and the valve itself is also slotted to register with the slots in partitions 38, said slots in the valve being so arranged that those at one end will register with the partition slots while at the same time the bars between the slots at the other end will cover the remaining slots in the partitions, so that a flow of water can be had to the outlet pipe while the inlet pipe will be closed and vice versa.

On the shaft 35, to the rear of chain-pulley 34 is fixed a plain pulley 39 which carries an upwardly extending arm 40, to the upper end of which is pivoted a lock-pawl 41 whose free end is adapted to travel back and forth in a shallow guide-box 42, when wheel 39 is rotated, and also engage a lock-pin 43 which projects through the bottom of said guide-box into the path of said lock-pawl to prevent clockwise rotation of shaft 35 when valve 14 is in its forward position to open the inlet supply. This lock-pin 43 is operated to an unlocking position by a chain 44 having one end connected to the lower end of pin 43 and passes around an idle pulley 45 and then being connected at its other end to the small pulley 32 fixed to the face of the chain-pulley 29. Thus, when chain-pulley 29 is rotated clockwise, the pulley 32 is also rotated and pulls on 44 thereby pulling lock-pin 43 out of the path of the locking-pawl 41.

Lock-wheel 28, belt wheels 29 and 32 are rotated clockwise simultaneously by a chain connection 46 which is connected at one end to the underside of the pulley 28 at 47, see Fig. 2, and at its other end is connected to a lift-rod 48, which is operated by a lever 49 having one end fulcrummed on the outer end of a bracket 50, and having its inner end pivoted to sleeve 21. Thus, an upward movement of float 11 and its sleeve 21 will lift rod 48, and through its chain connection 46 will rotate ratchet-wheel 28 and also the parts connected therewith. A pawl-lock 51 is provided for the ratchet-wheel 28 to prevent the wheel 28 having an anti-clockwise movement when the float 11 begins to fall and a tripping means is also provided for releasing the pawl 51 from the ratchet wheel 28 when the float has reached its lowermost position to release the wheel 28 to turn anti-clockwise, said tripping means consisting of a trip-lug 53 secured to rod 48 in a position to engage a pivoted lever 54 and thus lift the pawl 51 out of notch 28'.

Power-wheel 15 is adapted to rotate in the same direction at all times, whether the float is rising or falling, and a suitable chain transmission is provided for this purpose. The power-wheel is fixed on a shaft 55 mounted in suitable bearings formed in the supporting frame 20 mounted on the top-side of the tank 10. This shaft has also loosely mounted thereon two sprocket wheels 56 and 57 and each of said sprocket wheels has pivotally mounted thereon spring-held pawls 58 and 59 which engage ratchet wheels 60 and 61. These ratchet wheels 60 and 61 have their teeth faced in the same direction and the pawls 58 also face in the same direction. At a point below the wheels 56, 57 is another pair of wheels 63, 64 fixed to a shaft journalled on the frame 20, these two wheels being rigidly attached together. Connecting the wheels 56 and 63 is an uncrossed chain 62, and connecting the other pair of wheels 57 and 64 is a crossed chain 62'. The transmission chain 62 is operated up and down by the sleeve 21 through a rigid connection 65 fixed to the top of the sleeve and chain respectively. The upper sections of the chains 62 and 62' are preferably of the sprocket type, while the lower sections can be the usual plain chain type.

A relatively heavy spring 66 is connected to under leg of the chain 33 for the purpose of turning wheel 39, lock pawl 41, and valve 14 to opened positions, that is, supplying water to the tank 10 and at the same time pulling down a light spring 67 which is connected to wheel 39 to get ready for closed positions. A relatively light spring and chain connection 67 is connected to wheel 39 and a suitable support for exerting a clockwise movement on this wheel.

In Fig. 2, the float has reached its lowermost position and pawl 51 has been raised out of its notch 28'. The parts are now in position for the big spring 66 to come into action. This spring when thus released turns the wheels 28, 29 anti-clockwise, the pull chain 46 having been relaxed by the fall of the rod 48. This operation of the wheels 28, 29 slacks up on chain 44 and allows pin 43 to spring up to its operating position. This action also pulls on the top leg of the chain 33 and causes rotation anti-clockwise of the pulleys 39, 41 to thereby perform three operations, namely, first, tension the light spring 67, actuate the valve to inlet position and pull back the pawl 34 to the left of the lock pin 43, the latter function of course serving to admit the water to a point under the float and thus start the float on its upward movement. As the float moves upwardly, the pawl 51 is released and allowed to ride freely on the periphery of pulley 28, and when the float reaches its upper limit, or thereabouts, this pawl 51 again comes back into its notch 28' and thus prevents anti-clockwise movement of the pulleys 28, 29 until the float again descends to its bottom position.

When the float reaches its uppermost position, the spring 66 will have been tensioned and the pin 43 will have been drawn down out of the pathway of the pawl 34, whereupon the pawl 34 will quickly shift to the right end of the trough 42 and thus shift the valve to draining position, thereby bringing about a descending action of the float. This right hand throw of the pawl 41 is accomplished through the medium of the light spring 67, which has been previously tensioned by the contractile action of the heavy spring 66. When the float starts downwardly, the chain 46 is not re-wound on its pulley 28 but falls laxly away from the periphery of the same and remains in that position until this slack is taken up by the subsequent action of the big spring 66. On the downward movement of the float no operation takes place until the pawl 51 is again lifted out of its notch 28', whereupon the big spring 66 comes into action to not only take up the slack in chain 46, but also, as stated, throw the pawl 41 over to the left and shift the valve to draining position.

It will be understood that all the movable parts of the valve-shifting mechanism move but a very short distance, it being probably unnecessary to shift them a greater distance than is indicated by the width of the slots in the valve. This lack of necessity of shifting the parts to any great degree enables me to use the endless chain 14 mounted on a pair of pulleys. When the float is rising and the wheel 29 is moved in a clockwise direction, the pawl-carrying pulleys at the other side will not be given any appreciable degree of rotation because the pawl 41 is then lying against the pin 43. This prevention of transmission of rotary motion to the pawl-carrying pulleys is prevented by providing the usual slight slack in the chain 33, or in the alternative, by providing for slight slippage action on either the pulley 29 or the pulley 34. When the pulley 29 is thus rotated in a clockwise direction and the pawl 41 is against pin 43, it straightens out the slack in the under leg of the chain and transfers it to the upper leg of the chain and thus permits the wheel 29 to turn without rotating the wheel 39; this lack in the upper leg of the chain also permits the pawl 41 to shift past the pin 43 as soon as the pin releases the pawl without imparting any rotative action to the wheel 29, and thereby transferring the slack to the under leg of the chain. It will be kept in mind, as stated, that but a very slight movement of the parts is required to shift the pawl 41 and the valve.

It will be understood that the details of my apparatus may be considerably varied without departing from the spirit of the invention as defined in the claims. For instance, any other suitable means may be employed for translating the up and down movement of the tubular rod 21 into a continuous rotary motion. The translating devices I illustrate operate in an obvious manner. Upon the up movement of the rod 21, the chain 62 will, with the help of the pulleys 63, 64 (which latter pulleys are rigidly attached together) drive the chain wheel 56 in power direction, while at the same time the crossed chain will be driving the pulley 57 in a non-power direction, with its ratchets merely clicking. When the rod 21 descends, the pulley 56 will be driven in a non-driving clicking direction, while the other pulley 57 will be driven in the opposite direction to continue the application of power to the shaft 55 through the medium of the pawl 59.

An important feature of my invention is that I provide for a very quick action of the valve at the reversal points of the float to thereby eliminate the dwells at these points, thus insuring virtually a continuous operation in one direction of the driven shaft 55. I accomplish this by the use of two springs, one stronger than the other, and two locking devices, one of which is tripped at the upper extremity of movement of the float, and the other of which is tripped at the lower extremity of movement of the float. The upward movement of the float tensions the strong spring so that when it is released from this tension by the release of the tripping device at the lower extremity of movement of the float it will not only instantaneously shift the valve to inlet position, but will also tension the weaker spring, so that when the float again reaches its topmost position and thus trips the locking device associated with this weaker spring, this weaker spring will come into action, independently of the big spring, to instantaneously shift the valve to draining position and hold it there during the draining operation. Upon completion of the draining operation, the other locking device will be released to thus permit the previously tensioned big spring to be released and thus again open the valve as well as re-tension the small spring and re-set its associated locking device. As stated, the main purpose of my valve actuating mechanism is to insure as quick action in shifting the valve as possible in mechanical devices to thus insure a continuous, practically unbroken revolution of the driven shaft in the one direction.

I claim:

1. In a water power apparatus of the class set forth, a reservoir or tank, a float therein, means connected to the float for translating its up and down movement into continuous rotary motion of a shaft, and an automatic valve mechanism for controlling the admission and emission of water in the tank embodying a vertically movable member actuated up and down with the float, and means actuated by this member for alternately shifting the valve to admitting position and draining position whereby so long as a head of water is maintained at the inlet the float will alternately rise and fall automatically and thus impart a continuous rotary motion to the aforesaid shaft, said valve mechanism embodying a shiftable valve, a pinion for alternately opening and closing said valve, and devices for quickly alternately rotating this pinion embodying a pair of belt pulleys, a belt or chain connecting these pulleys, devices for alternately locking the pulleys against rotation, and means actuated alternatively from said vertically movable member for releasing said locking devices to permit a shifting of the valve from one position to the other.

2. In a water power apparatus of the class set forth, a tank, a float therein, means connected to the float for translating its up and down movement into rotary motion of a shaft, inlet and outlet pipes for the tank and valve means for controlling said pipes, and means actuated by the up and down movements of the float for instantaneously alternately shifting the valve from draining position to inlet position, said means embodying a strong spring and devices actuated by the upward movement of the float for tensioning this spring, devices for locking this spring under tension during the descent of the float and for releasing its tension when the float reaches its lower position, a weaker spring and devices whereby this spring is tensioned by the stronger spring when it is released, devices associated with this weaker spring for opening the valve to draining position when this weaker spring is released, and locking devices for this weaker spring and its associated parts, and devices actuated when the float reaches its upper position for releasing these locking devices.

3. In a water power of the type described, a tank having inlet and outlet means embodying valve devices, a float in the tank, means connected to the float for translating its up and down movement into rotary motion of a shaft, a spring for instantaneously actuating the valve devices to draining position and another spring for instantaneously actuating the valve devices to filling position, devices for tensioning said springs by the movement of said float, a locking device for holding each of said springs tensioned, a tripping device for tripping one of said locking devices when the float reaches the top of its movement and another tripping device for releasing the other locking device when the float reaches its lower position.

JAJAVAL PURNASIRI.